(12) United States Patent
Jeon et al.

(10) Patent No.: US 10,416,654 B2
(45) Date of Patent: Sep. 17, 2019

(54) APPARATUS AND METHOD FOR IDENTIFYING WEB PAGE FOR INDUSTRIAL CONTROL SYSTEM

(71) Applicant: ELECTRONICS AND TELECOMMUNICATIONS RESEARCH INSTITUTE, Daejeon (KR)

(72) Inventors: Sungho Jeon, Busan (KR); Jeong-Han Yun, Daejeon (KR); Woonyon Kim, Daejeon (KR); Eung Ki Park, Daejeon (KR); Sangwoo Park, Daejeon (KR)

(73) Assignee: ELECTRONICS AND TELECOMMUICATIONS RESEARCH INSTITUTE, Daejeon (KR)

( * ) Notice: Subject to any disclaimer, the term of this patent is extended or adjusted under 35 U.S.C. 154(b) by 440 days.

(21) Appl. No.: 14/741,529

(22) Filed: Jun. 17, 2015

(65) Prior Publication Data

US 2016/0062344 A1    Mar. 3, 2016

(30) Foreign Application Priority Data

Aug. 29, 2014    (KR) ........................ 10-2014-0113868

(51) Int. Cl.
*G06F 17/30* (2006.01)
*G05B 19/409* (2006.01)
(Continued)

(52) U.S. Cl.
CPC ......... *G05B 19/409* (2013.01); *G05B 19/408* (2013.01); *H04L 63/1433* (2013.01); *G05B 2219/34444* (2013.01)

(58) Field of Classification Search
CPC ........ G06F 17/30864; G06F 17/30867; G06Q 30/02
(Continued)

(56) References Cited

U.S. PATENT DOCUMENTS 7,072,963 B2 * 7/2006 Anderson ......... H04L 29/12009
370/392
2001/0052016 A1 * 12/2001 Skene .................... G06F 9/505
709/226
(Continued)

FOREIGN PATENT DOCUMENTS

KR    10-2009-0033149 A    4/2009

OTHER PUBLICATIONS

Seppo Tiilikainen, "Improving the National Cyber-security by Finding Vulnerable Industrial Control Systems from the Internet," Master Degree Thesis of School of Electrical Engineering of Aalto University, Aalto University Library, 2014.
(Continued)

*Primary Examiner* — Jeff A Burke
*Assistant Examiner* — Thong H Vu
(74) *Attorney, Agent, or Firm* — LRK Patent Law Firm

(57) ABSTRACT

An apparatus for identifying a web page for an industrial control system includes an information collection unit and an industrial control system identification unit. The information collection unit receives IP targets, from which web pages are to be collected, from a user, and collects web pages and information from the IP targets. The industrial control system identification unit identifies web pages for one or more industrial control systems with respect to the IP targets based on the information collected by the information collection unit.

16 Claims, 3 Drawing Sheets

(51) Int. Cl.
*H04L 29/06* (2006.01)
*G05B 19/408* (2006.01)

(58) Field of Classification Search
USPC .......................... 707/706; 726/2, 25; 705/39
See application file for complete search history.

(56) References Cited

U.S. PATENT DOCUMENTS

| | | | |
|---|---|---|---|
| 2003/0046311 A1* | 3/2003 | Baidya | G06F 17/30873 |
| 2006/0026114 A1 | 2/2006 | Gregoire et al. | |
| 2007/0143851 A1* | 6/2007 | Nicodemus | G06F 21/55 |
| | | | 726/25 |
| 2009/0216760 A1* | 8/2009 | Bennett | G06F 17/30864 |
| 2013/0340082 A1 | 12/2013 | Shanley | |
| 2014/0359760 A1* | 12/2014 | Gupta | H04L 63/1408 |
| | | | 726/22 |
| 2015/0106260 A1* | 4/2015 | Andrews | G06Q 20/4016 |
| | | | 705/39 |

OTHER PUBLICATIONS

Roland C. Bodenheim, "Impact of the Shodan Computer Search Engine on Internet-Facing Industrial Control System Devices," Mar. 27, 2014 (Mar. 27, 2014), XP055240157, Air Force Institute of Technology.

Eireann P. Leverett, "Quantitatively Assessing and Visualising Industrial System Attack Surface," Jun. 30, 2011 (Jun. 30, 2011), XP055240150, University of Cambridge.

* cited by examiner

APPARATUS AND METHOD FOR IDENTIFYING WEB PAGE FOR INDUSTRIAL CONTROL SYSTEM

CROSS-REFERENCE TO RELATED APPLICATION

This application claims the benefit of Korean Patent Application No. 10-2014-0113868 filed Aug. 29, 2014, which is hereby incorporated by reference herein in its entirety.

BACKGROUND

1. Technical Field

The present disclosure relates generally to an apparatus and method for identifying a web page for an industrial control system and, more particularly, to an apparatus and method that are capable of collecting web pages over the Internet and identifying web pages for one or more industrial control systems.

2. Description of the Related Art

In the mid-1900s, many industrial control systems were designed. Since there were no cyber threats during this period, cyber security was not taken into account at all.

However, due to the life cycles of industrial control system equipment and systems that have been used for longer than 10 years, the cyber security of industrial control system equipment and systems as well as security in a general IT environment have become serious issues.

Unlike a cyber security incident in a general IT environment that harms many persons within a specific range, a cyber security incident in an industrial control system may cause a very serious ripple effect.

Recently, industrial control systems have been the priority targets of international cyber wars and terrors, the security of the industrial control systems is required urgently.

As cyber attacks and accidents targeted at industrial control systems have occurred since 2000, the importance of cyber security for industrial control systems has increased.

Accordingly, in view of the characteristics of industrial control system equipment and systems, research into the security of a closed network and research into the security of specific equipment have been conducted.

However, one of the principal reasons why industrial control systems are exposed to cyber threats, unlike at the time at which they were designed, is that the industrial control systems are exposed to the external Internet. As industrial control systems have been connected to the external Internet in order to use services, such as remote management, many advantages, such as efficient operation, have occurred. However, the problem of being exposed to cyber threats has also occurred.

A more serious problem is that the administrators of many industrial control systems do not take into account cyber security. What is worse, some administrators are not aware that their industrial control systems are exposed to the Internet without using appropriate security measures.

Furthermore, since industrial control systems are used in a wide variety of fields as well as, manufacturing factories and have the same system structure, cyber security for industrial control systems is of primary importance.

Therefore, the identification of industrial control systems through the collection and identification of web pages over the open Internet is very crucial for cyber security.

A related technology is disclosed in the thesis by Tiilikainen Seppo, Manner, Jukka, "Improving the National Cyber-security by Finding Vulnerable Industrial Control Systems from the Internet," Aalto University Library, Master Degree Thesis.

SUMMARY

At least some embodiments of the present invention are directed to the provision of an apparatus and method for identifying a web page for an industrial control system, which examine web pages collected over the open Internet and identify web pages for one or more industrial control systems.

In accordance with an aspect of the present invention, there is provided an apparatus for identifying a web page for an industrial control system, including: an information collection unit configured to receive IP targets, from which web pages are to be collected, from a user and to collect web pages and information from the IP targets; and an industrial control system identification unit configured to identify web pages for one or more industrial control systems with respect to the IP targets based on the information collected by the information collection unit.

The industrial control system identification unit may identify the type of each of the web pages for the industrial control systems with respect to the IP targets via N identification characteristics and M identification models.

The identification characteristics may include, whether an external source is used, similarity comparison, WHOIS, web page content, simple login type, and monitoring type.

The identification models may include type 1, type 2, and type 3.

The industrial control system identification unit may classify each of the web pages for the industrial control systems with respect to the IP targets as type 1 if the industrial control system identification unit obtains a result value indicating that "an external source is not used" in the examination of whether an external source is used, a result value indicative of "similarity" in the examination of similarity comparison, and a result value indicative of a "pass" in the examination of WHOIS.

Type 1 may correspond to a case where each of the web pages for the industrial control systems is very similar to a web page provided by an industrial control system device manufacturer.

The industrial control system identification unit may classify each of the web pages for the industrial control systems with respect to the IP targets as type 2 if the industrial control system identification unit obtains a result value indicating that "an external source is not used" in the examination of whether an external source is used, a result value indicative of "dissimilarity" in the examination of similarity comparison, a result value indicative of "being suspected to be a control system" in the examination of web page content, and a result value indicative of "simple login type (YES)" in the examination of simple login type.

Type 2 may correspond to a case where each of the web pages for the industrial control systems has a keyword, making the web page suspected to be a web page for an industrial control system, and has a very simple administrator login form.

The industrial control system identification unit may classify each of the web pages for the industrial control systems with respect to the IP targets as type 3 if the industrial control system identification unit obtains a result value indicating that "an external source is not used" in the examination of whether an external source is used, a result value indicative of "dissimilarity" in the examination of similarity comparison, a result value indicative of "being suspected to be a control system" in the examination of web page content, a result value indicative of "a non-simple login type (NO)" in the examination of simple login type, and a result value indicative of "monitoring type (YES)" in the examination of monitoring type.

Type 3 may correspond to a case where a web page has a keyword, making the web page suspected to be a web page for an industrial control system, and corresponds to a field device state and system state monitoring web page.

In accordance with another aspect of the present invention, there is provided a method of identifying a web page for an industrial control system, including: receiving, by an information collection unit, IP targets, from which web pages are to be collected, from a user, and collecting, by the information collection unit, web pages and information from the IP targets; and identifying, by an industrial control system identification unit, web pages for one or more industrial control systems with respect to the IP targets based on the information collected by the information collection unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
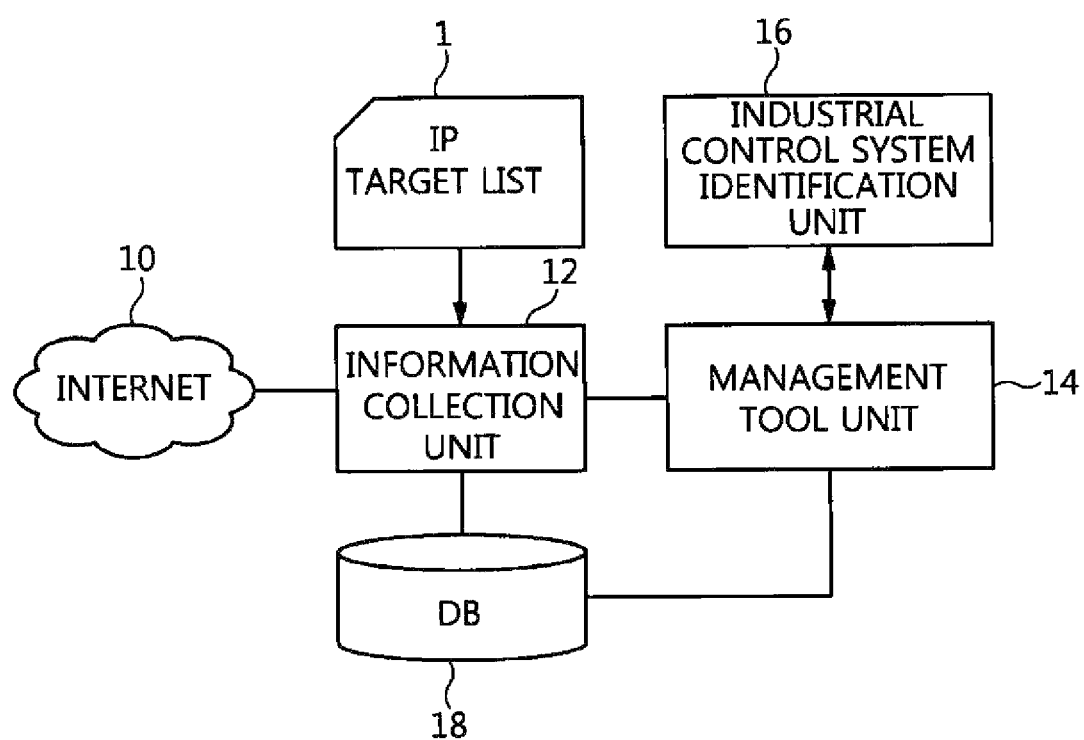
FIG. 1 is a configuration diagram of an apparatus for identifying a web page for an industrial control system according to an embodiment of the present invention.

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

FIG. 1 is a configuration diagram of an apparatus for identifying a web page for an industrial control system according to an embodiment of the present invention.

The apparatus for identifying a web page for an industrial control system illustrated in FIG. 1 includes an information collection unit 12, a management tool unit 14, an industrial control system identification unit 16, and a database (DB) 18.

In the specification of the present invention, the term "industrial control system" includes an automation system and a Supervisory Control and Data Acquisition (SCADA).

The information collection unit 12 receives IP targets, from which web pages are to be collected, from a user, and collects web pages and information from the IP addresses of a corresponding range. The information collection unit 12 may be any form or type of configuration as long as it can visit various web pages and collect various types of information. For example, a crawler may be an example of the information collection unit 12.

The management tool unit 14 may display information collected by the information collection unit 12 and the result of identification performed by the industrial control system identification unit 16 via a graphical user interface (GUI).

The industrial control system identification unit 16 examines the collected web pages. In greater detail, the industrial control system identification unit 16 identifies web pages for one or more industrial control systems based on the information (that is, web pages and information about the corresponding web pages) collected by the information collection unit 12. Furthermore, the industrial control system identification unit 16 may classify each of the web pages for industrial control systems as any one of three types.

The DB 18 stores the information collected by the information collection unit 12 and the result of identification performed by the industrial control system identification unit 16.

Referring to the above-described FIG. 1, the information collection unit 12 receives an IP target list 1, from which web pages are to be collected, and ports from a user, collects web pages with respect to corresponding IP addresses, responses from the ports and the initial screen shots of the web pages, and stores them in the DB 18. The management tool unit 14 invokes the industrial control system identification unit 16 with respect to the information collected by the information collection unit 12, and allows the industrial control system identification unit 16 to identify a web page for an industrial control system.

Furthermore, the result of the identification of the type of web page for an industrial control system performed by the industrial control system identification unit 16 and the information collected by the information collection unit 12 are stored in the DB 18. Meanwhile, the information stored in the DB 18 may be retrieved for visualization in response to a request from the management tool unit 14.

Figure 2:
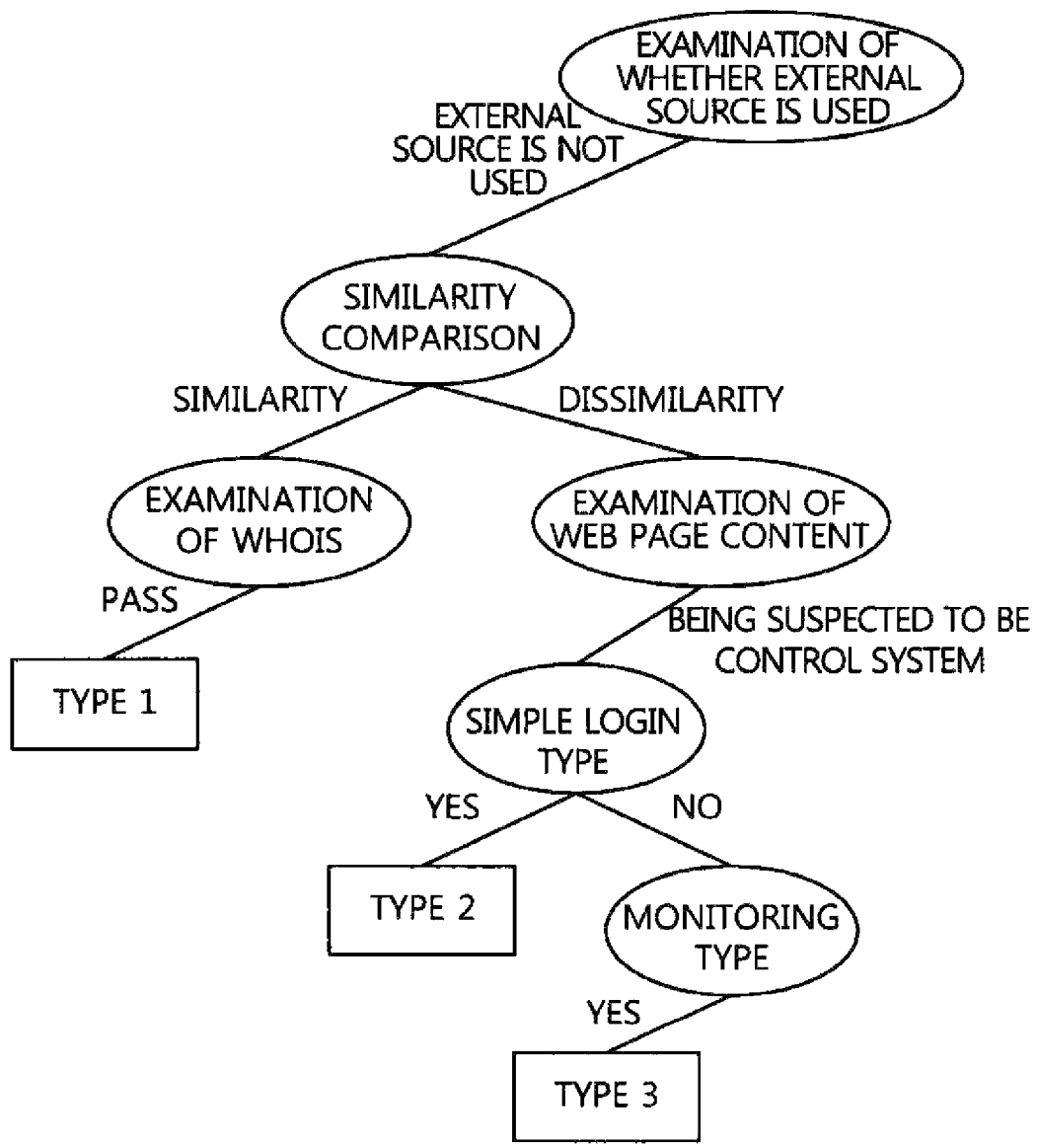
FIG. 2 is a diagram illustrating the types of web pages for industrial control systems identified by the industrial control system identification unit illustrated in FIG. 1.

FIG. 2 is a diagram illustrating the types of web pages for industrial control systems identified by the industrial control system identification unit illustrated in FIG. 1.

In an embodiment of the present invention, web pages for industrial control systems exposed to the Internet 10 are classified into a total of three types through actual data examination.

The industrial control system identification unit 16 uses six identification characteristics to perform classification into three types. Furthermore, the industrial control system identification unit 16 may additionally use an algorithm of identifying whether a corresponding port corresponds to an industrial control system protocol through communication with a specific port.

In this case, the types of web pages for industrial control systems may be classified into type 1, type 2, and type 3.

Type 1 corresponds to a case where a web page is very similar to a web page provided by the device manufacturer of an industrial control system.

Type 2 corresponds to a case where a web page has a keyword, making the web page suspected to be a web page for an industrial control system, and has a very simple administrator login form.

Type 3 corresponds to a case where a web page has a keyword, making the web page suspected to be a web page for an industrial control system, and corresponds to a field device state and system state monitoring web page.

Furthermore, the six industrial control system identification characteristics include whether an external source is used, similarity comparison, WHOIS, web page content, simple login type, and monitoring type.

Examination based on whether an external source is used is now described. Although there are cases where an industrial control system is connected to another organization to share data, an additional application for collecting and transmitting data is used, and an additional device for collecting information about a field device and transmitting the collected information to another device is used. Accordingly, when an external source, other than a C-class, such as the IP address of a web page, is used as the attribute (src attribute) of an HTML tag in the corresponding web page, it may be determined that a corresponding web page is not a web page for an industrial control system. Therefore, the results of the examination of whether an external source is used include two types of result values, i.e., a result value indicating that an external source is used and a result value indicating that an external source is not used.

Examination based on similarity comparison is now described. There are many cases where industrial control systems use web pages provided by manufacturers without change. In this case, web pages used only for industrial control system equipment and a system may be maintained and used to identify a web page for an industrial control system through the comparison with a collected web page. Basically, two types of result values, such as a result value indicative of similarity and a result value indicative of dissimilarity depending on a provided threshold value. The threshold value may be varied.

Examination based on WHOIS is now described. WHOIS is a service that provides information about a domain name and the owner of an IP address. In the case of a specific organization, such as a university, a laboratory or the like, an owner may be determined via WHOIS. Through this, a case where an industrial control system is operated for specific research or a specific test may be excluded. The results of the examination based on WHOIS include two types of result values, i.e., a result value indicative of a pass through WHOIS and a result value indicative of no pass through WHOIS.

Examination based on web page content is now described. When a word clearly meaning an industrial control system is included in the content of a web page, the examination based on web page content may be used to identify a web page for an industrial control system. To reduce many erroneous detection cases related to a manufacturer home page, a security news site, a blog, etc., the examination based on web page content may be performed by assigning positive and negative weights and then calculating scores.

Examination based on simple login type is now described. Simple login type is a characteristic that is used to identify a web page simply having a specific keyword and a login type, as in the case of type 2. Therefore, there are two types of result values, i.e., simple login type (YES) and non-simple login type (NO).

Examination based on monitoring type is now described. Monitoring type is a characteristic that is used to identify a web page having suspicious keywords and corresponding to an equipment state monitoring web page, as in the case of type 3. A monitoring web page is different from other web pages in terms of a tag structure and used words. With regard to a tag structure, the tag frequency of <table>, <frame> and <div> corresponds to a very high proportion of the total number of tags. The frequency of tags dependent on the tag "<table>," such as <tr> and <td>, is included in the frequency of <table>, and the frequencies of <frame> and <div> are calculated in the same manner. With regard to words, a very few types of words are used, unlike in general web pages. Therefore, this identification characteristic is used to calculate the Shannon entropy of all tags and words from a web page and then produce a result value indicative of monitoring type if the Shannon entropy is equal to or lower than a specific threshold value or a result value indicative of a non-monitoring type if the Shannon entropy is higher than, the specific threshold value.

Referring to FIG. 2, if the industrial control system identification unit 16 obtains a result value indicating that "an external source is not used" in the examination of whether an external source is used, a result value indicative of "similarity" in the examination of similarity comparison, and a result value indicative of a "pass" in the examination of WHOIS, the industrial control system identification unit 16 classifies a web page for an industrial control system related to an IP target currently under examination as type 1.

Meanwhile, if the industrial control system identification unit 16 obtains a result value indicating that "an external source is not used" in the examination of whether an external source is used, a result value indicative of "dissimilarity" in the examination of similarity comparison, a result value indicative of "being suspected to be a control system" in the examination of web page content, and a result value indicative of "simple login type (YES)" in the examination of simple login type, the industrial control system identification unit 16 classifies a web page for an industrial control system related to an IP target currently under examination as type 2.

Meanwhile, if the industrial control system identification unit 16 obtains a result value indicating that "an external source is not used" in the examination of whether an external source is used, a result value indicative of "dissimilarity" in the examination of similarity comparison, a result value indicative of "being suspected to be a control system" in the examination of web page content, a result value indicative of "a non-simple login type (NO)" in the examination of simple login type, and a result value indicative of "monitoring type (YES)" in the examination of monitoring type, the industrial control system identification unit 16 classifies a web page for an industrial control system related to an IP target currently under examination as type 3.

If the above-described apparatus of the present invention performs examination, such as IP tracking, on a provided result, the accurate information of a found object can be identified.

Using the above-described present invention, it may be possible to identify web pages for one or more industrial control systems with respect to IP targets via the above characteristics (that is, six identification characteristics) and identification models (three types) and use them to prevent a cyber terror and a cyber security incident.

Figure 3:
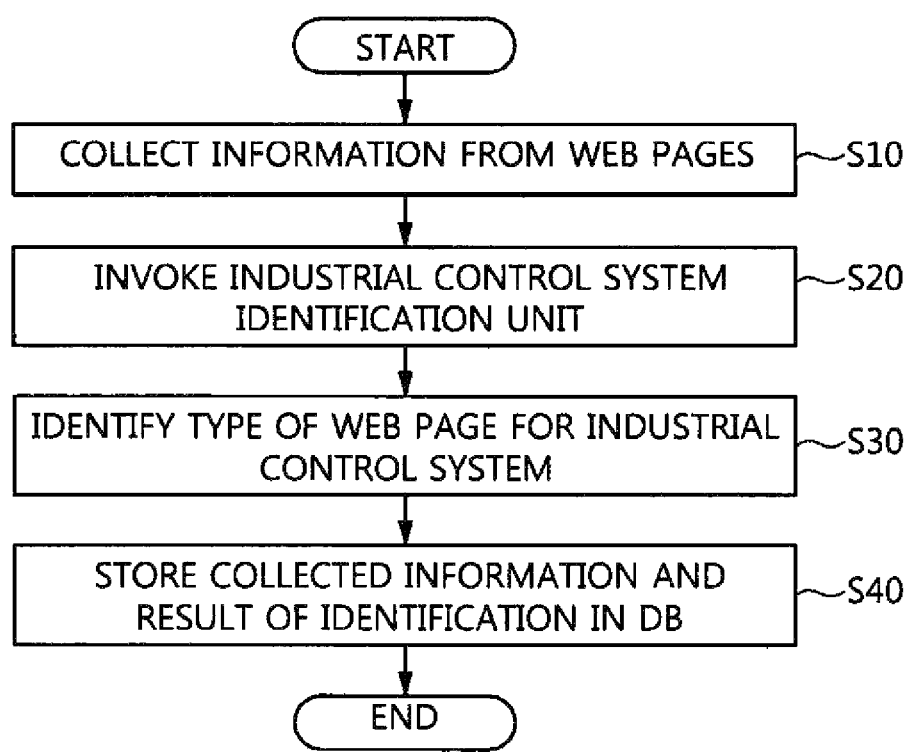
FIG. 3 is a flowchart illustrating a method of identifying a web page for an industrial control system according to an embodiment of the present invention.

FIG. 3 is a flowchart illustrating a method of identifying a web page for an industrial control, system according to an embodiment of the present invention.

The information collection unit 12 receives IP targets, from which web pages are to be collected, from a user, and collects web pages and information from the IP addresses of a corresponding range at step S10. In greater detail, the information collection unit 12 receives an IP target list 1, from which web pages are to be collected, and ports from a user. Thereafter, the information collection unit 12 collects web pages with respect for corresponding IP addresses, responses from the ports and the initial screen shots of the web pages, and stores them in the DB 18.

Thereafter, the management tool unit 14 invokes the industrial control system identification unit 16 at step S20.

Accordingly, the industrial control system identification unit 16 identifies web pages for one or more industrial control systems with respect to the IP targets based on the information collected by the information collection unit 12. That is, the industrial control system identification unit 16 identifies the type of each of the web pages for industrial control systems with respect to the IP targets via six identification characteristics and three identification models (type 1, type 2, and type 3) at step S30. In this case, the identification operation of the industrial control system identification unit 16 can be sufficiently understood from the above description given with reference to FIG. 2.

Thereafter, the information collected by the information collection unit 12 and the result of the identification performed by the industrial control system identification unit 16 are stored in the DB 18 at step S40. Meanwhile, the information stored in the DB 18 may be retrieved for visualization in response to a request from the management tool unit 14.

According to the present invention configured as described above, a malicious cyber security incident and terror can be prevented by finding a web site for an industrial control system, exposed to the outside without using appropriate security measures, earlier than a malicious attacker and then providing information about the web site to an administrator.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for identifying a web page for an industrial control system, comprising:
    an information collection unit configured to receive IP targets, from which web pages are to be collected, from a user and to collect web pages and information from the IP targets; and
    an industrial control system identification unit configured to identify web pages for one or more industrial control systems with respect to the IP targets based on the information collected by the information collection unit,
    wherein the industrial control system identification unit identifies a type of each of the web pages for the industrial control systems with respect to the IP targets via N identification characteristics and M identification models,
    wherein the identification characteristics comprise whether an external source is used, similarity comparison, WHOIS, web page content, simple login type, and monitoring type, and
    wherein the similarity comparison comprises comparison of the web page with a collected web page provided by a manufacturer and a result value of similarity depends on a provided threshold value.

2. The apparatus of claim 1, wherein the identification models comprise type 1, type 2, and, type 3.

3. The apparatus of claim 2, wherein the industrial control system identification unit classifies each of the web pages for the industrial control systems with respect to the IP targets as type 1 if the industrial control system identification unit obtains a result value indicating that "an external source is not used" in examination of whether an external source is used, a result value indicative of "similarity" in examination of similarity comparison, and a result value indicative of a "pass" in examination of WHOIS.

4. The apparatus of claim 3, wherein type 1 corresponds to a case where each of the web pages for the industrial control systems is very similar to a web page provided by an industrial control system device manufacturer.

5. The apparatus of claim 2, wherein the industrial control system identification unit classifies each of the web pages for the industrial control systems with respect to the IP targets as type 2 if the industrial control system identification unit obtains a result value indicating that "an external source is not used" in examination of whether an external source is used, a result value indicative of "dissimilarity" in examination of similarity comparison, a result value indicative of "being suspected to be a control system" in examination of web page content, and a result value indicative of "simple login type (YES)" in examination of simple login type.

6. The apparatus of claim 5, wherein type '2 corresponds to a case where each of the web pages for the industrial control systems has a keyword, making the web page suspected to be a web page for an industrial control system, and has a very simple administrator login form.

7. The apparatus of claim 2, wherein the industrial control system identification unit classifies each of the web pages for the industrial control systems with respect to the IP targets as type 3 if the industrial control system identification unit obtains a result value indicating that "an external source is not used" in examination of whether an external source is used, a result value indicative of "dissimilarity" in examination of similarity comparison, a result value indicative of "being suspected to be a control system" in examination of web page content, a result value indicative of "a non-simple login type (NO)" in examination of simple login type, and a result value indicative of "monitoring type (YES)" in examination of monitoring type.

8. The apparatus of claim 7, wherein type 3 corresponds to a case where a web page has a keyword, making the web page suspected to be a web page for an industrial control system, and corresponds to a field device state and system state monitoring web page.

9. A method of identifying a web page for an industrial control system, comprising:
  receiving, by an information collection unit, IP targets, from which web pages are to be collected, from a user, and collecting, by the information collection unit, web pages and information from the IP targets; and
  identifying, by an industrial control system identification unit, web pages for one or more industrial control systems with respect to the IP targets based on the information collected by the information collection unit,
  wherein identifying the web pages for the industrial control systems comprises identifying a type of each of the web pages for the industrial control systems with respect to the IP targets via N identification characteristics and M identification models,
  wherein the identification characteristics comprise whether an external source is used, similarity comparison, WHOIS, web page content, simple login type, and monitoring type, and
  wherein the similarity comparison comprises comparison of the web page with a collected web page provided by a manufacturer and a result value of similarity depends on a provided threshold value.

10. The method of claim 9, wherein the identification models comprise type 1, type 2, and type 3.

11. The method of claim 10, wherein identifying the web pages for the industrial control systems comprises classifying each of the web pages for the industrial control systems with respect to the IP targets as type I if the industrial control system identification unit obtains a result value indicating that "an external source is not used" in examination of whether an external source is used, a result value indicative of "similarity" in examination of similarity comparison, and a result value indicative of a "pass" in examination of WHOIS.

12. The method of claim 11, wherein type 1 corresponds to a case where each of the web pages for the industrial control systems is very similar to a web page provided by an industrial control system device manufacturer.

13. The method of claim 10, wherein identifying the web pages for the industrial control systems comprises classifying each of the web pages for the industrial control systems with respect to the IP targets as type 2 if the industrial control system identification unit obtains a result value indicating that "an external source is not used" in examination of whether an external source is used, a result value indicative of "dissimilarity" in examination of similarity comparison, a result value indicative of "being suspected to be a control system" in examination of web page content, and a result value indicative of "simple login type (YES)" in examination of simple login type.

14. The method of claim 13, wherein type 2 corresponds to a case where each of the web pages for the industrial control systems has a keyword, making the web page suspected to be a web page for an industrial control system, and has a very simple administrator login form.

15. The method of claim 10, wherein identifying the web pages for the industrial control systems comprises classifying each of the web pages for the industrial control systems with respect to the IP targets as type 3 if the industrial control system identification unit obtains a result value indicating that "an external source is not used" in examination of whether an external source is used, a result value indicative of "dissimilarity" in examination of similarity comparison, a result value indicative of "being suspected to be a control system" in examination of web page content, a result value indicative of "a non-simple login type (NO)" in examination of simple login type, and, a result value indicative of "monitoring type (YES)" in examination of monitoring type.

16. The method of claim 15, wherein type 3 corresponds to a case where a web page has a keyword, making the web page suspected to be a web page for an industrial control system, and corresponds to a field device state and system state monitoring web page.

* * * * *